United States Patent
Seol et al.

(10) Patent No.: US 7,492,603 B2
(45) Date of Patent: Feb. 17, 2009

(54) STRUCTURE AND METHOD FOR REDUCING IMPEDANCE-DISCONTINUITY IN FLEXIBLE PRINTED CIRCUIT OF HARD DISK DRIVE

(75) Inventors: Byong-su Seol, Yongin-si (KR); Hark-byeong Park, Suwon-si (KR); Hyung-geun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 492 days.

(21) Appl. No.: 11/242,940

(22) Filed: Oct. 5, 2005

(65) Prior Publication Data

US 2006/0146510 A1 Jul. 6, 2006

(30) Foreign Application Priority Data

Jan. 4, 2005 (KR) .................... 10-2005-0000383

(51) Int. Cl.
*H05K 9/00* (2006.01)
(52) U.S. Cl. ................. 361/753; 361/799; 361/800; 361/816; 361/818; 361/749; 174/254; 174/350; 360/124
(58) Field of Classification Search ........... 361/685, 361/686, 749, 753, 799, 800, 816, 818; 174/254, 174/255, 350, 378, 353, 355; 360/124
See application file for complete search history.

(56) References Cited

U.S. PATENT DOCUMENTS

| 5,375,021 | A | * | 12/1994 | Boeckner ................. 360/97.01 |
| 5,400,195 | A | * | 3/1995 | Morii et al. ............. 360/97.01 |
| 5,541,788 | A | * | 7/1996 | Ishida et al. ............ 360/98.01 |
| 5,555,619 | A | * | 9/1996 | Maggio et al. ................ 29/860 |
| 5,583,320 | A | * | 12/1996 | Eriguchi et al. ............. 174/254 |
| 5,583,720 | A | * | 12/1996 | Ishida et al. ............ 360/97.01 |
| 5,995,321 | A | * | 11/1999 | Ishida ..................... 360/97.01 |
| 6,734,368 | B1 | * | 5/2004 | Jimarez et al. ............. 174/255 |
| 6,943,302 | B2 | * | 9/2005 | Kageyama et al. .......... 174/254 |
| 7,319,573 | B2 | * | 1/2008 | Nishiyama ............... 360/245.9 |

* cited by examiner

*Primary Examiner*—Jeremy C Norris
*Assistant Examiner*—Dameon E Levi
(74) *Attorney, Agent, or Firm*—Sughrue Mion, PLLC

(57) ABSTRACT

Provided is a structure for reducing an impedance-discontinuity in a flexible printed circuit of a hard disk drive. The structure includes an actuator arm, a bracket, a flexible printed circuit having one end installed at the actuator arm and an other end installed at the bracket and including various circuits, and a metal member facing the flexible printed circuit and having one end installed at the actuator arm and an other end installed at the bracket.

14 Claims, 5 Drawing Sheets

STRUCTURE AND METHOD FOR REDUCING IMPEDANCE-DISCONTINUITY IN FLEXIBLE PRINTED CIRCUIT OF HARD DISK DRIVE

BACKGROUND OF THE INVENTION

This application claims priority from Korean Patent Application No. 10-2005-0000383, filed on Jan. 4, 2005, in the Korean Intellectual Property Office, the disclosure of which is incorporated herein in its entirety by reference.

1. Field Of The Invention

The present invention relates to a hard disk drive (HDD) and, more particularly, to a structure and method for reducing an impedance-discontinuity in a flexible printed circuit of an HDD.

2. Description Of The Related Art

Hard disk drives (HDDs), which are auxiliary information storage devices for computers, read data stored in a disk or write data to the disk using a read/write head.

FIG. 1 is a top plan view of a conventional HDD. Here, an HDD employing a contact start stop (CSS) type head parking system will now be explained.

Referring to FIG. 1, the HDD includes a magnetic disk (hard disk) 20 acting as a data recording medium, a spindle motor 30 installed on a base member 10 and rotating the disk 20, an actuator arm 40 having a read/write head 41 for writing data on the disk 20 and reading data written to the disk 20, a flexible printed circuit unit 60 transferring data to a printed circuit board (PCB) that is installed under the base member 10, and a flexible printed circuit 70 interconnected from the flexible printed circuit unit 60 to the actuator arm 40.

The actuator arm 40 includes a swing arm 46 that can pivot about a pivot 47 installed on the base member 10. A suspension 44 is installed at an end of the swing arm 46 to elastically bias a slider 42 on which the read/write head 41 is mounted toward a surface of the disk 20.

The actuator arm 40 is rotated by a voice coil motor (VCM) 50. The VCM 50 includes a VCM coil 56 coupled to the other end of the swing arm 46. Magnets (not shown) are disposed over and under the VCM coil 56 to face the VCM coil 56.

During write and read operations of the conventional HDD having this structure, a lifting force induced by the rotation of the disk 20 and an elastic force of the suspension 44 are applied to the slider 42 on which the read/write head 41 is mounted. Accordingly, the slider 42 is kept floating at a predetermined height where the lifting force and the elastic force are balanced. As a result, the read/write head 41 mounted on the slider 42 writes or reads data on the disk 20 while being spaced a predetermined distance from the rotating disk 20.

An impedance-discontinuity occurs in the flexible printed circuit of the conventional HDD, which will now be explained with reference to FIGS. 2 and 3.

FIG. 2 is a vertical sectional view of the flexible printed circuit unit shown in FIG. 1. FIG. 3 is a vertical sectional view of the flexible printed circuit disposed between a bracket and the actuator arm shown in FIG. 1.

Referring to FIGS. 2 and 3, the flexible printed circuit unit 60 includes a bracket 63 and a flexible printed circuit 64 disposed over the bracket 63. The flexible printed circuit 64 includes an insulator 62 and various circuits 61 formed on the insulator 62. The flexible printed circuit 70 disposed between the actuator arm 40 and the bracket 63 includes an insulator 72 and various circuits 71 formed on the insulator 72. Here, although the flexible printed circuits 64 and 70 are integrally formed with each other, they are given different reference numerals because their positions are different, for a convenient explanation.

In general, the base member 10 is made of metal. Various metal parts including the bracket 63 are attached to the base member 10. Accordingly, since the flexible printed circuit 64 disposed over the bracket 63 is in close contact with the base member 10 and the metal parts attached to the base member 10, the flexible printed circuit 64 significantly affects the base member 10 and the metal parts attached to the base member 10.

However, both ends of the flexible printed circuit 70 are respectively installed at the actuator arm 40 and the bracket 63, such that the flexible printed circuit 70 interposed between the actuator arm 40 and the bracket 63 is located in a space above the base member 10. Accordingly, as compared with the flexible printed circuit 64 disposed over the bracket 63, the flexible printed circuit 70 has less of an affect on the base member 10 and the metal parts attached to the base member 10.

Consequently, although the flexible printed circuits 64 and 70 are integrally formed with each other, an electromagnetic field formed around the flexible printed circuit 64 is different from an electromagnetic field formed around the flexible printed circuit 70, and thus impedances of the flexible printed circuits 64 and 70 are different from each other. In particular, the impedance at a point where the flexible printed circuit 64 is connected to the bracket 63 is considerably different from the impedance at a point where the flexible printed circuit 70 is connected to the actuator arm 40. If the impedance-discontinuity occurs between the flexible printed circuits 64 and 70, electric signals transmitted through the flexible printed circuits 64 and 70 are delayed or lost, thereby resulting in malfunction of the HDD or electromagnetic interference (EMI) with the HDD.

SUMMARY OF THE INVENTION

The present invention provides a structure and method for reducing an impedance-discontinuity in a flexible printed circuit of a hard disk drive to prevent delay or loss of electric signals transmitted through the flexible printed circuit.

According to an aspect of the present invention, there is provided a structure for reducing an impedance-discontinuity in a flexible printed circuit of a hard disk drive, the structure comprising: an actuator arm; a bracket; a flexible printed circuit having one end installed at the actuator arm and an other end installed at the bracket and including various circuits; and a metal member facing the flexible printed circuit and having one end installed at the actuator arm and an other end installed at the bracket.

According to another aspect of the present invention, there is provided a method of reducing an impedance-discontinuity in a flexible printed circuit of a hard disk drive, the method comprising: providing an actuator arm, a bracket, a flexible printed circuit, and a metal member; and installing the metal member at the actuator arm and the bracket so that the metal member can face the flexible printed circuit.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF THE INVENTION

Figure 1:
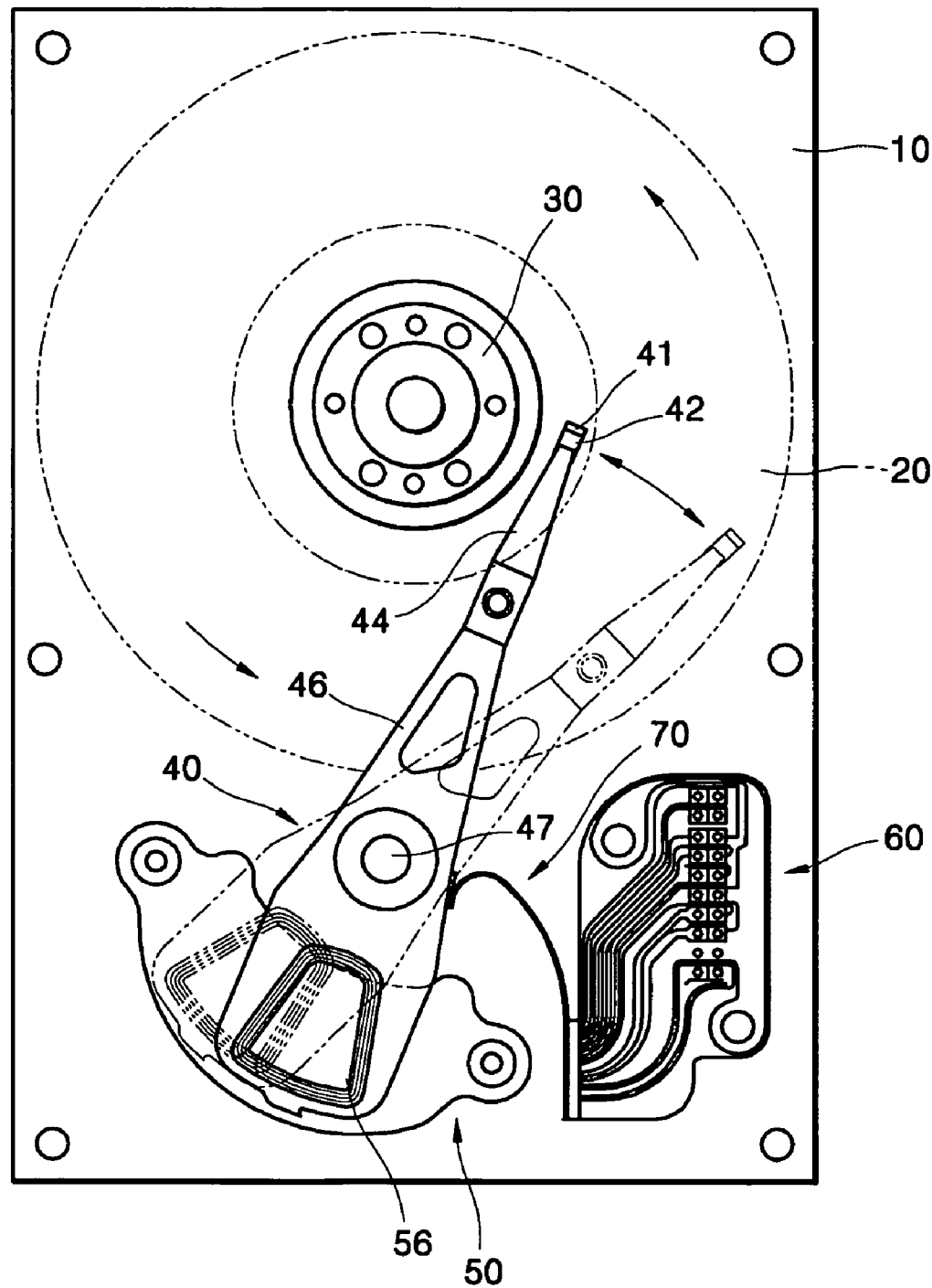
FIG. 1 is a top plan view of a conventional hard disk drive (HDD)
Figure 2:
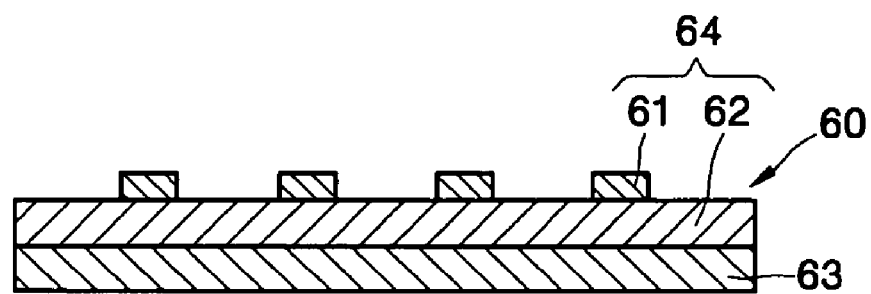
FIG. 2 is a vertical sectional view of a flexible printed circuit unit shown in FIG. 1.
Figure 3:
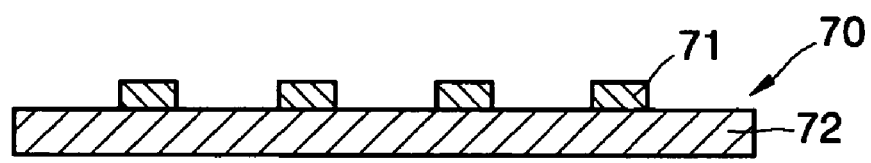
FIG. 3 is a vertical sectional view of a flexible printed circuit disposed between an actuator arm and a bracket shown in FIG. 1.

The present invention will now be described more fully with reference to the accompanying drawings, in which exemplary embodiments of the invention are shown. The same elements are given the same reference numerals throughout the drawings.

Figure 4:
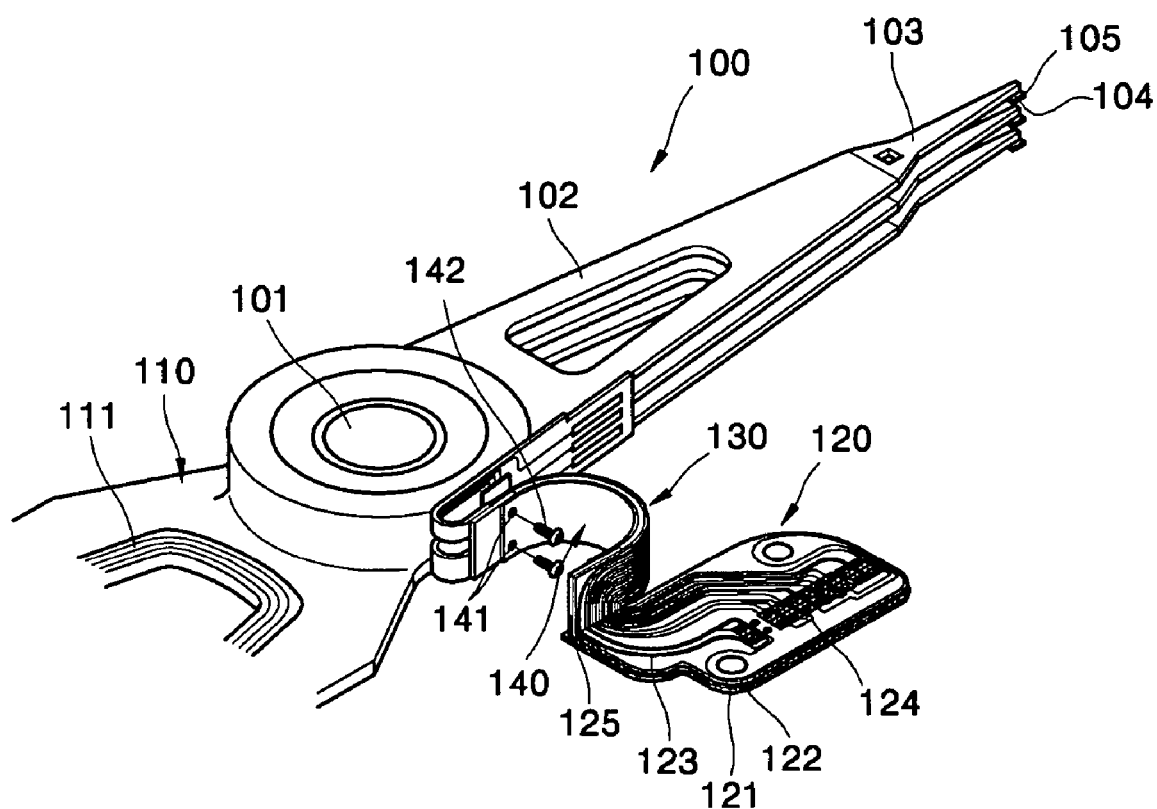
FIG. 4 is a perspective view of a structure for reducing an impedance-discontinuity in a flexible printed circuit of an HDD according to an exemplary embodiment of the present invention.
Figure 5:
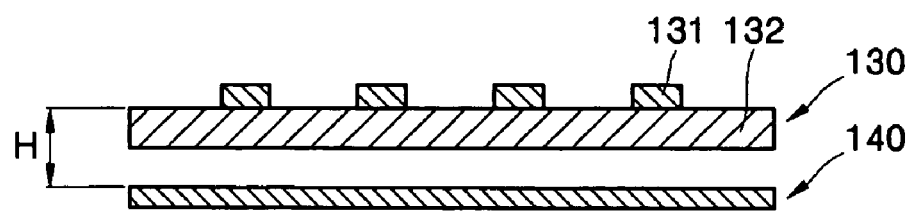
FIG. 5 is a vertical sectional view of the impedance-discontinuity reducing structure in the flexible printed circuit shown in FIG. 4.

FIG. 4 is a perspective view of a structure for reducing an impedance-discontinuity in a flexible printed circuit of a hard disk drive (HDD). FIG. 5 is a vertical sectional view of the impedance-discontinuity reducing structure in the flexible printed circuit shown in FIG. 4.

Referring to FIGS. 4 and 5, the HDD includes an actuator arm 100 having a read/write head 105 for writing data on a disk and reading data written to the disk, a flexible printed circuit unit 120 driving the actuator arm 100, and a flexible printed circuit 130 interconnected from the flexible printed circuit unit 120 to the actuator arm 100.

The actuator arm 100 includes at least one swing arm 102 installed to pivot about a pivot 101, and a suspension 103 installed at one end of the swing arm 102 and elastically biasing a slider 104 on which the read/write head 105 is mounted.

The actuator arm 100 is rotated by a voice coil motor (VCM) 110. The VCM 110 includes a VCM coil 111 coupled to the other end of the swing arm 102.

The flexible printed circuit unit 120 includes a flexible printed circuit 122, a bracket 121 supporting the flexible printed circuit 122, a connector 124 connecting the flexible printed circuit 122 to a printed circuit board (PCB, not shown), and a support member 125 changing the direction of extension of the flexible printed circuit 122.

The flexible printed circuit 122 of the flexible printed circuit unit 120 extends up to a side surface of the actuator arm 100 by means of the support member 125 that changes the direction of extension of the flexible printed circuit 122. The flexible printed circuit 130 which reaches the side surface of the actuator arm 100 extends in two directions toward the read/write head 105 and the VCM coil 111. In this case, although the flexible printed circuit 130 interposed between the actuator arm 100 and the flexible printed circuit unit 120 is the extension of the flexible printed circuit 122 of the flexible printed circuit unit 120, the flexible printed circuits 122 and 130 are given different reference numerals for a more convenient explanation. The flexible printed circuit 130 includes an insulator 132, and various circuits 131 formed on the insulator 132.

According to the present invention, the HDD includes a metal member 140 facing the flexible printed circuit 130 and having opposite ends installed at the actuator arm 100 and the bracket 121, respectively. It is preferable, but not necessary, that the facing metal member 140 and flexible printed circuit 130 be spaced a predetermined distance from each other. Since the metal member 140 faces the flexible printed circuit 130, identical or similar electromagnetic fields can be formed around the flexible printed circuit 130 and the flexible printed circuit unit 120. This will be explained with reference to the following formula.

$$Z \propto \sqrt{\frac{L}{C}} \quad (1)$$

where Z represents impedance, L represents inductance per unit length, and C represents capacitance per unit length.

As shown in formula 1, the impedance Z can be controlled by changing the inductance L and the capacitance C. The inductance L and the capacitance C can be controlled by changing a distance H between the metal member 140 and the various circuits 131. That is, if the distance H is reduced, the inductance L is reduced, the capacitance C is increased, and thus the impedance Z is reduced. If the distance H is increased, the inductance L is increased, the capacitance C is reduced, and thus the impedance Z is increased.

Since the HDD consistent with the present invention includes the metal member 140, an electromagnetic field formed around the flexible printed circuit 130 disposed between the actuator arm 100 and the bracket 121 and an electromagnetic field around the flexible printed circuit 122 disposed over the bracket 121 of the flexible printed circuit unit 120 can be substantially identical or similar to each other.

In this case, it is preferable, but not necessary, that a distance between the metal member 140 and the various circuits 131 of the flexible printed circuit 130 facing the metal member 140 be substantially identical to a distance between the bracket 121 and various circuits 123 formed on the bracket 121 of the flexible printed circuit 122. In this state, as shown in formula 1, the two distances H become substantially identical to each other, and thus the impedances of both the flexible printed circuit 130 and the flexible printed circuit 122 can be substantially equal to each other.

Further, it is preferable, but not necessary, that the distance between the metal member 140 and the flexible printed circuit 130 be maintained substantially constant. In this state, as shown in formula 1, the distance H between the metal member 140 and the flexible printed circuit 130 is constant in a longitudinal direction, and thus impedances between the actuator arm 100 and the flexible printed circuit unit 120 can be substantially the same value.

Meanwhile, the metal member 140 may be fastened to the support member 125 of the flexible printed circuit unit 120 and the actuator arm 100 using insertion holes 141 formed in end portions thereof and fastening members 142, such as a screws, inserted into the insertion holes 141.

Furthermore, it is preferable, but not necessary, that the metal member 140 is made of the same metal as that of the various circuits 131 of the flexible printed circuit 130. Since the various circuits 131 of the flexible printed circuit 130 are generally made of copper, the metal member 140 is preferably, but not necessarily, made of copper.

Figure 6:
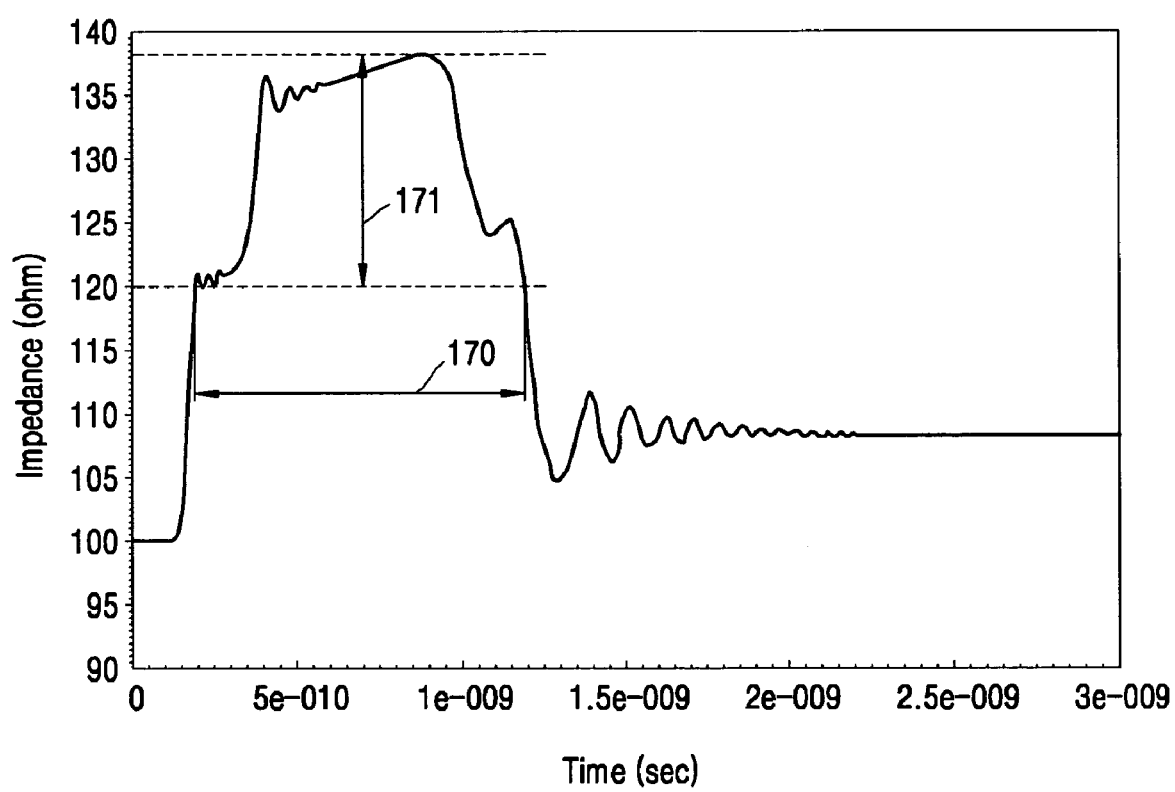
FIG. 6 is a graph illustrating an impedance variation in a conventional flexible printed circuit of an HDD.
Figure 7:
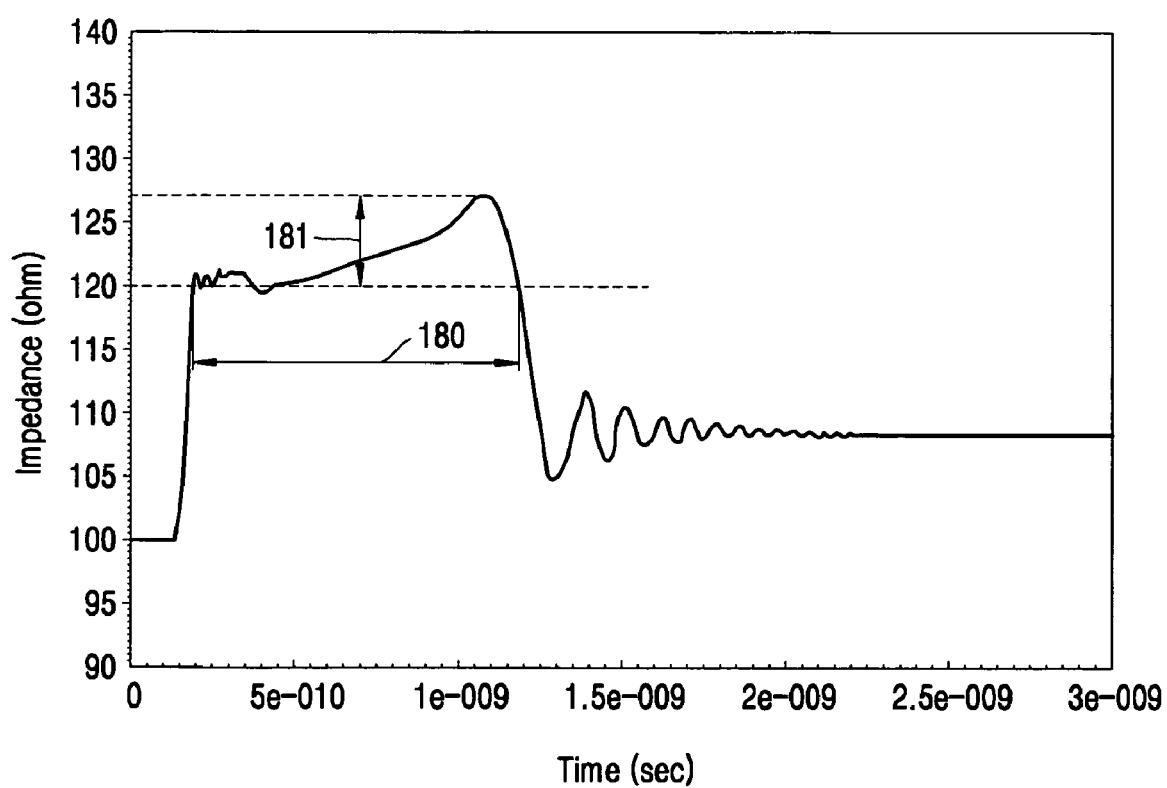
FIG. 7 is a graph illustrating an impedance variation in the flexible printed circuit of the HDD according to the present invention.

FIG. 6 is a graph illustrating impedance changes in a conventional flexible printed circuit of an HDD. FIG. 7 is a graph illustrating impedance changes in the flexible printed circuit of the HDD according to the present invention.

Here, reference numeral 170 shown in FIG. 6 denotes a section of a flexible printed circuit formed spanning between a bracket and an actuator arm of the conventional HDD, and reference numeral 171 denotes an impedance variation in the section 170 of the flexible printed circuit. Reference numeral 180 shown in FIG. 7 denotes a section of the flexible printed circuit 130 spanning between the bracket 121 and the actuator arm 100 of the HDD according to the present invention, and reference numeral 181 denotes an impedance variation in the section of the flexible printed circuit 130.

Referring to FIGS. 6 and 7, the impedance variation 171 in the section 170 between the bracket and the actuator arm in the conventional HDD is approximately 18$\Omega$, whereas the impedance variation 181 in the section 180 between the bracket 121 and the actuator arm 100 in the HDD according to the present invention is approximately 7$\Omega$. According to the present invention, an impedance-discontinuity in the flexible printed circuit of the HDD can be reduced by approximately 60%.

As described above, since the structure and method for reducing the impedance-discontinuity in the flexible printed circuit of the HDD according to the present invention includes the metal member interconnected between the actuator arm and the bracket to face the flexible printed circuit, the impedance of the flexible printed circuit between the actuator arm and the bracket can be controlled. Accordingly, since the impedance of the flexible printed circuit disposed between the actuator arm and the bracket and the impedance of the flexible printed circuit disposed over the bracket can be equal to each other, the impedance-discontinuity in the flexible printed circuit of the HDD can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A structure for reducing an impedance-discontinuity in a flexible printed circuit of a hard disk drive, the structure comprising:
    an actuator arm;
    a bracket;
    a flexible printed circuit having one end installed at the actuator arm and an other end installed at the bracket and including various circuits; and
    a metal member facing the flexible printed circuit and having one end installed at the actuator arm and an other end installed at the bracket,
    wherein at least a portion of the metal member facing the flexible printed circuit is separated from the flexible printed circuit by an air gap.

2. The structure of claim 1, wherein the metal member facing the flexible printed circuit is spaced a predetermined distance from the flexible printed circuit.

3. A structure for reducing an impedance-discontinuity in a flexible printed circuit of a hard disk drive, the structure comprising:
    an actuator arm;
    a bracket;
    a flexible printed circuit having one end installed at the actuator arm and an other end installed at the bracket and including various circuits, and
    a metal member facing the flexible printed circuit and having one end installed at the actuator arm and an other end installed at the bracket,
    wherein the metal member facing the flexible printed circuit is spaced a predetermined distance from the flexible printed circuit
    wherein a distance between the metal member and the various circuits on the flexible printed circuit is substantially identical to a distance between the bracket and various circuits on a flexible printed circuit disposed over the bracket.

4. The structure of claim 2, wherein a distance between the metal member interconnected from the actuator arm to the bracket and the flexible printed circuit is substantially constant.

5. The structure of claim 1, wherein the metal member is fastened to the actuator arm and the bracket by fastening members.

6. The structure of claim 1, wherein the metal member is made of the same metal as that of the flexible printed circuit.

7. The structure of claim 1, wherein the metal member is made of copper.

8. A method of reducing an impedance-discontinuity in a flexible printed circuit of a hard disk drive, the method comprising:
    providing an actuator arm, a bracket, a flexible printed circuit, and a metal member; and
    installing the metal member at the actuator arm and the bracket so that the metal member can face the flexible printed circuit,
    wherein at least a portion of the metal member facing the flexible printed circuit is separated from the flexible printed circuit by an air gap.

9. The method of claim 8, wherein the installing of the metal member comprises spacing the metal member by a predetermined distance from the facing flexible printed circuit.

10. A method of reducing an impedance-discontinuity in a flexible printed circuit of a hard disk drive, the method comprising:
    providing an actuator arm, a bracket, a flexible printed circuit, and a metal member; and
    installing the metal member at the actuator arm and the bracket so that the, metal member can face the flexible printed circuit,
    wherein the installing of the metal member comprises spacing the metal member by a predetermined distance from the facing flexible printed circuit,
    wherein the spacing of the metal member from the flexible printed circuit comprises spacing the metal member from the flexible printed circuit so that a distance between the metal member and various circuits on the flexible printed circuit facing the metal member can be substantially identical to a distance between the bracket and various circuits on a flexible printed circuit disposed over the bracket.

11. The method of claim 9, wherein the spacing of the metal member from the flexible printed circuit comprises spacing the metal member from the flexible printed circuit so that a distance between the metal member interconnected from the actuator arm to the bracket and the flexible printed circuit can be substantially constant.

12. The method of claim 8, wherein the installing of the metal member comprises fastening one end of the metal member to the actuator arm and an other end of the metal member to the bracket using fastening members.

13. The method of claim 8, wherein the providing of the metal member comprises providing the metal member made of the same metal as that of the flexible printed circuit.

14. The method of claim 8, wherein the providing of the metal member comprises providing the metal member made of copper.

\* \* \* \* \*